United States Patent [19]
Hobson et al.

[11] Patent Number: 5,694,559
[45] Date of Patent: Dec. 2, 1997

[54] ON-LINE HELP METHOD AND SYSTEM UTILIZING FREE TEXT QUERY

[75] Inventors: Samuel D. Hobson, Seattle; Eric Horvitz, Kirkland; David E. Heckerman, Bellevue; John S. Breese, Mercer Island; Erich-Søren Finkelstein, Bellevue; Gregory L. Shaw, Kirkland; James R. Flynn; Karen Jensen, both of Bellevue, all of Wash.

[73] Assignee: Microsoft Corporation, Redmond, Wash.

[21] Appl. No.: 400,797

[22] Filed: Mar. 7, 1995

[51] Int. Cl.⁶ ............................ G06F 17/28; G06F 17/30
[52] U.S. Cl. .................. 395/336; 395/603; 395/758; 395/759
[58] Field of Search .................. 395/600, 603–606, 395/12, 155, 156, 161, 336–338, 758–759; 364/419.08, 419.13

[56] References Cited

U.S. PATENT DOCUMENTS

| | | | |
|---|---|---|---|
| 5,099,426 | 3/1992 | Carlgren et al. | 364/419.13 |
| 5,133,046 | 7/1992 | Kaplan | 395/61 |
| 5,197,005 | 3/1993 | Shwartz et al. | 364/419.13 |
| 5,247,677 | 9/1993 | Welland et al. | 395/650 |
| 5,287,448 | 2/1994 | Nicol et al. | 395/159 |
| 5,317,507 | 5/1994 | Gallant | 364/419.13 |
| 5,325,298 | 6/1994 | Gallant | 364/419.19 |
| 5,371,807 | 12/1994 | Register et al. | 382/159 |
| 5,386,556 | 1/1995 | Hedin et al. | 395/600 |
| 5,418,948 | 5/1995 | Turtle | 395/600 |
| 5,432,902 | 7/1995 | Matsumoto | 395/156 |
| 5,483,632 | 1/1996 | Kuwamoto et al. | 395/156 |
| 5,488,725 | 1/1996 | Turtle et al. | 395/600 |
| 5,535,323 | 7/1996 | Miller et al. | 395/155 |
| 5,546,521 | 8/1996 | Martinez | 395/155 |

OTHER PUBLICATIONS

Cooper, Wm. S., "The Formalism of Probability Theory in IR: A Foundation or an Encumbrance?", S.L.I.S., University of California, Berkeley, CA 94720, pp. 242–247, 1994.

Cooper, William S., "Some Inconsistencies and Misnomers in Probabilistic Information Retrieval," 1991 ACM 0-89791-448-1/91/0009/0057, pp. 57–61.

Tzeras, Kostas, and Stephan Hartman, "Automatic Indexing Based on Bayesian Inference Networks," *Teschnische Hochschule Darmstadt, Fachbereich Informatik*, 1993 ACM 0-89791-605-0/93/0006/0022, pp. 22–34.

Bookstein, Abraham, and Don R. Swanson, "A Decision Theoretic Foundation for Indexing", *Journal of the American Society for Information Science*, Jan.–Feb. 1975, pp. 45–50.

Cooper, W.S., and M.E. Maron, "Foundations of Probabilistic and Utility–Theoretic Indexing," *Journal of the Association for Computing Machinery*, vol. 25, No. 1, Jan. 1978, pp. 67–80.

Del Favero, Brendan and Robert Fung, "Bayesian Inference with Node Aggregation for Information Retrieval," *The Second Text Retrieval Conference (TREC–2)*, National Institute of Standards and Technology, Gaithersburg, Maryland, 1994, pp. 151–161.

*Primary Examiner*—Paul V. Kulik
*Attorney, Agent, or Firm*—Seed and Berry LLP

[57] ABSTRACT

An improved free text query method and system is provided as part of an improved on-line help system. In a preferred embodiment of the present invention, the on-line help system provides a free text query system that performs partial analysis. The partial analysis performed by the preferred embodiment includes identifying keywords within input provided by the user, performing disambiguation analysis, performing definiteness analysis, performing capitalization analysis, and generating a ranked list of candidates according to a probability associated with each candidate. In addition, the preferred embodiment of the present invention is internationalizable. That is, the present invention is easily ported between different languages.

31 Claims, 11 Drawing Sheets

ON-LINE HELP METHOD AND SYSTEM UTILIZING FREE TEXT QUERY

FIELD OF THE INVENTION

The present invention relates generally to data processing systems and, more particularly, to free text query systems.

BACKGROUND OF THE INVENTION

Associated with many software products is an on-line help system. On-line help systems typically provide assistance on many topics relating to the use of the associated software product. After invoking an on-line help system, a user is typically presented with the choice of index, search, or table-of-contents access to help topics. Each topic is presented through the use of a heading, which is a brief summary of the information contained in the topic. Using one of these methods, the user selects a topic. Upon selecting a topic, the on-line help system presents the user with information relating to the selected topic.

It is not uncommon for software products to have over one thousand help topics. Therefore, when a user needs help with the software product, the user searches through numerous headings to locate the topic appropriate for the needs of the user. Since the heading is a short description of the information contained within the topic, many times a user may have to access a topic and find that the topic does not contain the information that the user needs. In this event, the user must view the headings again and select another topic. Therefore, it can be appreciated that the search time incurred by a user to obtain help can be unacceptable, and lead to user frustration. User frustration can be compounded by the fact that many times a user does not know what information they need to help them. In other words, a user that is unfamiliar with the software product may not know of the name of the feature about which the user needs information.

SUMMARY OF THE INVENTION

An improved free text query system is described herein as part of an improved on-line help system. The free text query system described herein performs partial analysis. This partial analysis includes identifying keywords within input provided by the user, identifying metanyms associated with the keywords, performing disambiguation analysis, performing definiteness analysis, performing capitalization analysis, and generating a ranked list of candidates (e.g., help topics) according to the probability associated with each candidate. Metanyms are a higher level conceptual grouping of the keywords. Disambiguation analysis refers to analyzing the usage of the keywords and definiteness analysis refers to analyzing the form of the keywords. Capitalization analysis refers to analyzing the capitalization of the keywords. In addition, the system described herein is internationalizable and is therefore easily pored between languages.

In accordance with the first aspect of the present invention, a method is executed in a computer having a free text query system. In accordance with this method of the first aspect of the present invention, the free text query system receives input from a user comprising a plurality of words indicating a selection and generates a list of candidates for the selection. The free text query system has a plurality of keywords predetermined to be relevant to the type of the selection and metanyms that are a general concept describing a keyword. The method of the first aspect of the present invention provides for receiving input from the user, identifying keywords within the input, determining the metanym for each identified keyword, identifying a candidate associated with each metanym, and generating a list of the identified candidates according to an identifier associated with the candidates identifying a likelihood that the selection refers to the candidates.

In accordance with a second aspect of the present invention, a free text query system is provided that comprises a user input component, a keyword component, a disambiguation component, a candidate component, a definiteness component, and a generating component. The user input component provides for receiving user input indicating a selection. The keyword component provides for identifying keywords within the user input wherein a keyword is predetermined to be relevant to the type of the selection. The disambiguation component provides for determining the usage of each keyword and provides for determining a metanym associated with the usage of each keyword. The candidate component provides for identifying associated candidates with the metanyms. The definiteness component provides for determining a form for each keyword and adjusting a probability associated with each candidate. The generating component provides for generating a list of the candidates according to the probability associated with each candidate.

DETAILED DESCRIPTION OF THE INVENTION

Figure 1:
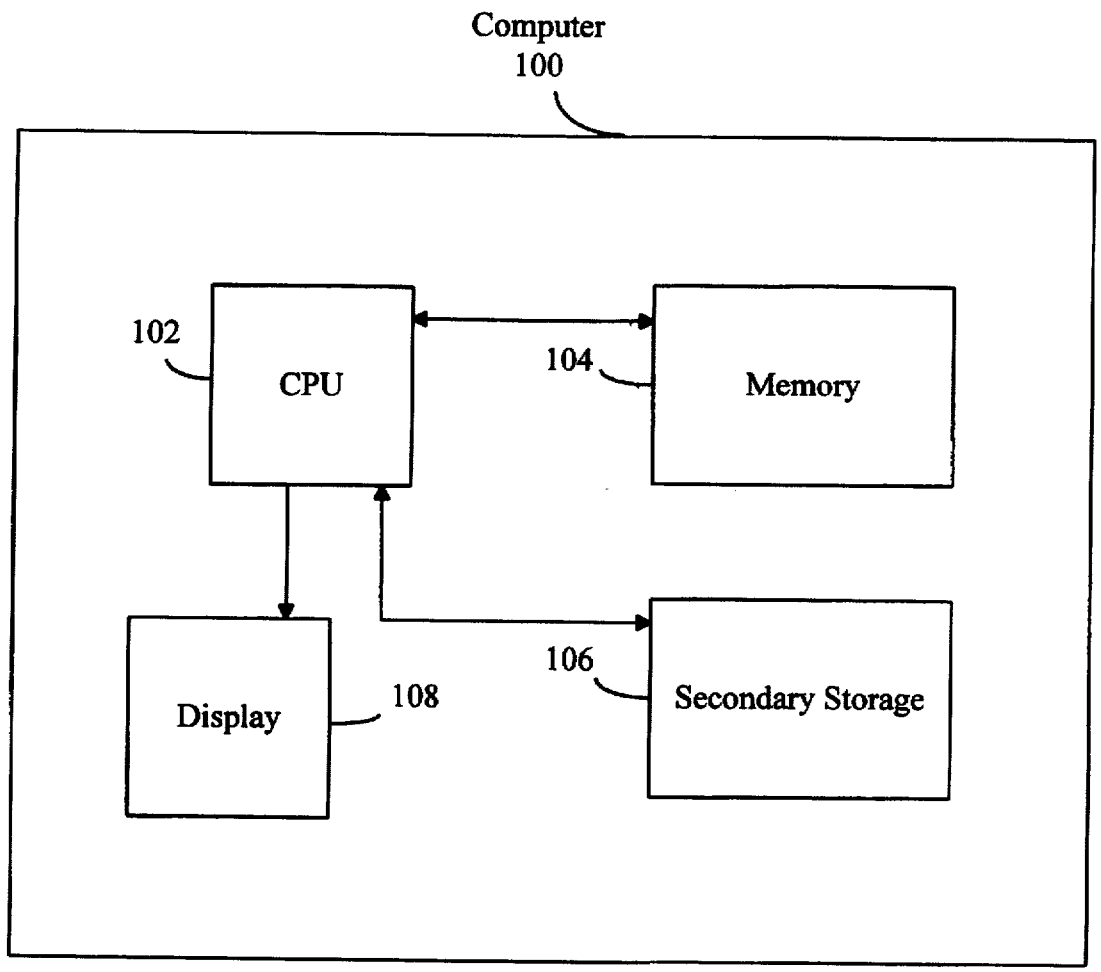
FIG. 1 depicts a computer suitable for practicing a preferred embodiment of the present invention.

A preferred embodiment of the present invention provides an on-line help system which utilizes an improved free text query system. The free text query system of the preferred embodiment receives unrestricted user input, performs partial analysis upon the user input, and then performs probability analysis to determine a list of help topics that are ranked by the likelihood that the topic will solve the needs of a user. The probability analysis performed by the present invention is based on a well-known theorem known as "Bayes theorem" and is sometimes referred to as "Bayesian analysis." By utilizing an improved free text query system, the preferred embodiment reduces the search time needed by a user to find an appropriate help topic and reduces user frustration. Further, the preferred embodiment is highly accurate in determining which topics will suit the needs of the user. In addition, the free text query system of the preferred embodiment is implemented so as to be readily ported from one natural language to another ("internationalizable"). In particular, a language-specific module ("the language DLL") is modularized and easily replaced to change languages, and the database utilized by the present invention can be localized.

In order to more clearly describe the preferred embodiment of the present invention, it is necessary to present the description in three parts. First, a conceptual overview of the preferred embodiment is presented. Second, the theories upon which the preferred embodiment is based are presented and third, the implementation details of the preferred embodiment are presented.

Conceptual Overview

Free text query systems receive "unrestricted" input from a user. Unrestricted input is unconstrained as to capitalization and punctuation. Typical free text query systems analyze the input received from the user and determine what the user wants. In making this determination, free text query systems may display results and allow for user input relating to the relevance of the results. Although a free text query system is described, one skilled in the art will appreciate that the present invention can also be used in a system that is constrained as to capitalization or punctuation.

Some free text query systems may perform a full natural language processing (NLP) analysis. A full NLP analysis refers to analyzing each and every word within the input to determine the meaning of the input. Full NLP analysis systems do a complete parse of the input, identify specially marked words in the input, identify the role that each word plays within the input (e.g., subject, predicate, etc.) and then determine the meaning of the input. Full NLP analysis systems are expensive in terms of storage and processing time. However, when a user utilizes an on-line help system, the user needs help within a short amount of time or else the user will simply not use the on-line help system. Therefore, since full NLP analysis systems require significant amounts of processing time, full NLP analysis systems are not today well suited for use with on-line help systems.

Based on the realization that an on-line help system should be both fast and accurate, otherwise the user will simply not use the on-line help system, the preferred embodiment performs "partial analysis." Partial analysis refers to a method of analysis that is not concerned with the structure of a phrase within the user input and what the phrase means. Instead, partial analysis is concerned with keywords and/or phrases within the user input, and such additional features as the capitalization of keywords ("capitalization analysis"), the form of the keywords ("definiteness analysis"), and the usage of the keywords ("noun-verb disambiguation analysis"). The term "keywords" refers to a set of words that are predetermined to be relevant to the software product that the user is utilizing. For example, if the user is utilizing a spreadsheet program, the set of keywords may include such terms as "cells," "rows," and "calculations." The preferred embodiment performs capitalization analysis to determine what the user wants. This is performed because different capitalizations of one word may have different meanings. For example, if a user uses "word" in the input, the user is most likely referring to the normal meaning of "word." However, if a user uses "Word" in the input, the user is most likely referring to the Microsoft Word software product developed by Microsoft Corporation of Redmond, Wash.

As related to definiteness analysis, the term "form" refers to a definite, indefinite, or neutral form of a word. That is, a noun phrase can have either a definite form or an indefinite form. The definite form of a noun phrase tends to refer to the existence of a particular object (i.e., the noun). The indefinite form of a noun phrase refers to the non-existence of a particular object. For example, if a user were utilizing a spreadsheet program and input "make a new chart" the chart is in an indefinite form since a particular chart is not in existence. On the other hand, if a user entered the input "how do I format my chart," the user is referring to the definite form of chart since a particular chart is in existence. The neutral form of a word refers to a word that is neither definite nor indefinite, such as a verb (e.g., make). As related to noun-verb disambiguation analysis, the "usage" of a word refers to the grammatical use of a word. Some words in the English language may have more than one usage and can be used for a different part of speech. For example, the word "type" may be used both as a noun and a verb. The preferred embodiment uses noun-verb disambiguation analysis to determine the usage of a word and to help accurately determine, based on the usage of the word, what the user wants.

Theoretical Overview

In order to more fully understand the details of the preferred embodiment, a discussion of the basic theoretical approach surrounding the preferred embodiment is provided, as well as a discussion of extensions to the basic theoretical approach. In a probabilistic approach to information retrieval, a set of relevant events based on word features (e.g., words, word phrases, words with capitalization status) are recorded in a database. In the free text query system of the preferred embodiment, these events are known as metanyms. The term "metanym" refers to concepts that are considered to be atomic features manipulated by the probabilistic analysis portion of the free text query system and are further described below. Metanyms are a higher level conceptual grouping of synonyms. The term "synonyms" refers to words that may be used to indicate a metanym. For example, in a help system for a spreadsheet program, the synonyms "new," "insert," "make," "create" and "generate" can refer to the metanym "create." In creating the free text query system of the preferred embodiment, the developers provide probabilities of the form Pr (query contains metanym m|help topic h). In a simplified version, this probability is referred to as Pr(m|h). That is, the probability that the user input contains a metanym "m" given that a help topic "h" is relevant. Therefore, the probability that the query does not contain the metanym "m" given help topic "h" is relevant is the complement of this probability, 1−Pr(m|h).

As part of the basic theoretical approach, all of the metanyms are identified within the user input and Bayes theorem is utilized to determine the probability of all help topics, Pr(h|M). Where "M" refers to all metanyms found in the user input. Thus, Pr(h|M) is the probability that the help topics are relevant given the set of metanyms identified in the input. After determining the metanyms identified in the input, the metanyms that are not identified are easily recognized. At this point, an assumption is made that the probabilities Pr(m|h) are conditionally independent of the existence of other metanyms in the input. By utilizing this assumption, the probability of each help topic "h" is then $$Pr(h|M) = \alpha p(h)(\Pi_i Pr(m_i|h))(\Pi_j[1 - Pr(m_j|h)])$$

where "$\alpha$" is a normalizing constant equal to the probability of identifying the set of metanyms in the input, where "p(h)" is the prior probability that the help topic will be considered relevant and is further discussed below, "$m_i$" are the metanyms that are present in the input and "$m_j$" are the metanyms that are absent from the input. The "$\alpha$" value is a normalization constant and, as such, is not needed to generate a score for each help topic. The score for each help topic is used to rank the help topics by the likelihood that the help topic will solve the needs of the user. Thus, the free text query system of the preferred embodiment ignores the "$\alpha$" value. Therefore, the score assigned to each help topic is calculated using the following formula:

$$Pr(h|M) = p(h)\Pi_i Pr(m_i|h)\Pi_j[1 - Pr(m_j|h)].$$

In constructing a free text query system, it would be wasteful to analyze all metanyms for all help topics. Therefore, the free text query system of the preferred embodiment allows the developers constructing the system to select for each help topic, those metanyms that are considered "relevant." Probabilities are then only assessed for the relevant ("linked") help topics. Thus, for each help topic and metanym there are four possible situations. The first situation is where a help topic has a link to a metanym that is not in the input. The second situation is where a help topic has a link to a metanym that is in the input. The third situation is where a help topic does not have a link to a metanym that is in the input and the fourth situation is where a help topic does not have a link to a metanym that is not in the input.

Based upon the above, the free text query system of the preferred embodiment uses a default probability known as a "leak" probability for those topics that are not linked. In the following notation, "$\epsilon$" is used to denote the leak probability. The leak probability captures the notion that when a metanym and a help topic are not linked, there is some small probability (the "leak") that the help topic is relevant given the appearance of the unlinked metanym in the input. Therefore, when input is analyzed, each of the four situations described above is considered and the probability of each help topic "h" is computed with the following formula:

$$Pr(h|M) = \alpha p(h)(\Pi_i Pr_i m_i|h))(\Pi_j[1 - Pr(m_j|h)])(\Pi_k \epsilon_k)(\Pi_l 1 - \epsilon_l)$$

Where "$m_i$" are linked metanyms that are present in the input, "$m_j$" are metanyms that are absent from the input, "$\epsilon_k$" are the default probabilities associated with metanyms in the input that are not linked to the help topic, and "$1-\epsilon_l$" are the probabilities of non-linked metanyms that are in the input. Therefore, the free text query system of the preferred embodiment scans a query, identifies metanyms and identifies the links (or the absence of links) to determine Pr(m|h) for each metanym. As an alternative to using the above formula, a more simplified approach has been found that renders desirable results. In this approach, only the probability Pr($m_i$|h) for linked metanyms and the leak probability for non-linked metanyms is considered. This formula is shown below:

$$Pr(h|M) = \alpha p(h)(\Pi_i Pr(m_i|h))(\Pi_j \epsilon_j)$$

Where "$m_i$" are linked metanyms that are present in the input and the leak probabilities "$\epsilon_j$" are factored in as penalties for metanyms "j" in the query that are not linked to the help topic. This formula is used as part of the continuing example in the implementation detail section below.

Now that the basic Bayesian approach has been discussed, there are several refinements or extensions to the basic approach that should be considered. The first extension relates to definiteness and indefiniteness. One class of structure that is common throughout the Indo-European languages is the use of "definiteness" in language. Functional words, such as conjunctions, possessives, articles, adjectives, verbs and prepositions, can provide strong evidence of definiteness of nouns at the core of noun phrases. "Definiteness," as previously discussed, refers to the existence versus the nonexistence of objects. For example, the use of possessives indicates that there is a high likelihood that the noun referred to by the functional word exists. Consider the phrase, "I would like to change the colors of text under my chart." The possessive "my" indicates that the chart is likely to exist. On the other hand, in the phrase, "How can I create a chart?" the article "a" is an indefinite article, thereby suggesting that "chart" is a desired, but as of yet, nonexisting object. Examples of articles indicating that a noun is used in a definite form include "this" and "the," whereas articles indicating that a noun is used in an indefinite form include "an" and "some." Examples of prepositions indicating the definite form include "under," "over," "near" and "around." An example of an adjective indicating the indefinite form is "new" and an example of a verb indicating the indefinite form is "create."

In utilizing the preferred free text query system, the developer has the option of noting whether a metanym is linked to a help topic in its definite or indefinite usage. For these cases, the probability for a metanym given a help topic is relevant is assessed as two numbers, Pr(m|indefinite,h) and Pr(m|definite,h). When the input is analyzed, functional words, such as articles, possessives and prepositions, are noted and used to identify noun clauses. Then the functional words that modify the noun phrases are used to compute the probability that the noun is being used in an indefinite way. Each functional word has an associated probability and therefore all of the functional words that are preceding a nonfunctional word are multiplied together to compute P(IIF), which is the indefinite probability given the preceding functional words. If there are no functional words that modify the noun clause, a default probability of indefinite "Pr(I)" is utilized. The definiteness/indefinite analysis performed by the preferred embodiment is discussed at greater length in the implementation detail section below.

Based on the basic approach described above, "Pr(IIF)" is used to compute Pr(m|h) and 1−Pr(m|h). In utilizing the likelihood of definiteness and indefiniteness, the formula for Pr(m|h) is described below:

$$Pr(m|h) = Pr(m|I, h)Pr(I|F_m) + Pr(m|\text{not } I, h)Pr(\text{not } I|F_m)$$

Where "$F_m$" indicates the functional words that modify noun clauses containing metanyms. It is assumed that words not labeled as indefinite or definite are used in the neutral form.

Another extension to the basic Bayesian approach is noun-verb disambiguation. In English, a particular set of words can be used both as nouns or verbs, depending on the structure of the phrase, as described above. Therefore, the accuracy of the basic Bayesian approach is enhanced by assessing separate probabilities and links for the noun form of words and the verb form of words. That is, links are provided and probabilities are assessed of the form Pr($m_v$|h) and Pr($m_n$|h) for a subset of specially marked metanyms, where "$m_v$" refers to the verb form of a metanym and "$m_n$" refers to the noun form of the metanym. As will be further described below, a set of functional words typically appear before and after the specially marked metanym that is used to detect with a high degree of certainty whether a word is being used as a noun or a verb. However, when there is an uncertainty of the usage, evidence can be gathered about the probability that the word is being used as either a noun or a verb and weight the probability similar to the weighting of probabilities in the indefinite/definite case described above. A formula which encompasses this concept is provided below.

$$Pr(m|h)=Pr(m_v|h)Pr(v|F_m)+Pr(m_n|h)Pr(n|F_m)$$

Where "$Pr(v|F_m)$" and "$Pr(n|F_m)$" refer to the probability that the metanym is used as a verb or noun, respectively, given the set of functional words.

Other extensions to the basic Bayesian approach are also utilized by the free text query system of the preferred embodiment. These extensions include detecting multiple candidate phrases from the input, detecting and using capitalization patterns in words ("capitalization analysis"), and the use of metanyms for enhancing the efficiency with which the free text query system of the preferred embodiment can be ported from one language to another. These extensions are discussed in greater detail below.

Implementation Detail

Although the free text query system of the present invention is described as being part of an on-line help system, one skilled in the art will recognize that the free text query system of the present invention can be used as part of other systems, processes, computer programs or other entities. In addition, although the free text query system and the on-line help system of the present invention are described as being implemented as part of an application program, one skilled in the art will recognize that the free text query system and the on-line help system of the present invention can be implemented as part of an operating system.

FIG. 1 depicts a computer suitable for practicing the preferred embodiment of the present invention. The computer 100 contains a central processing unit (CPU) 102, a memory 104, a secondary storage device 106, and a display 108. The CPU 102 is responsible for accessing data and computer programs on the secondary storage device 106. In addition, the CPU 102 is responsible for transferring computer programs into the memory 104 and executing the computer programs once resident in the memory. The display 108 is responsible for presenting information to a user. One skilled in the art will appreciate that a computer suitable for practicing the preferred embodiment of the present invention can contain additional or different components.

Figure 2:
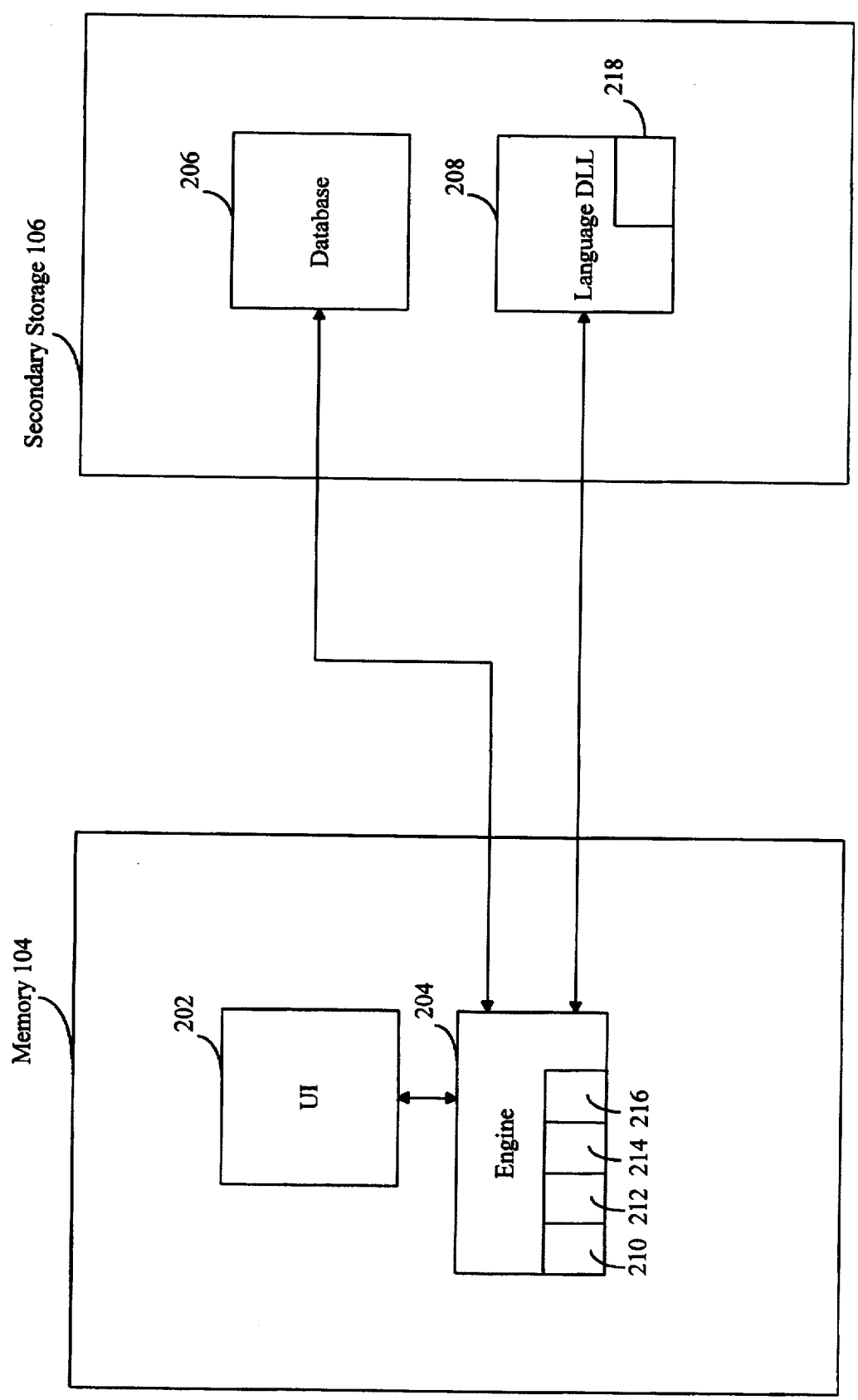
FIG. 2 depicts the preferred embodiment of the present invention within the computer of FIG. 1.

FIG. 2 shows the contents of the memory 104 and the secondary storage 106 in more detail. The memory 104 contains a user interface process (UI) 202 and an engine module 204. The secondary storage device 106 contains a database 206 and a language dynamically linked library (DLL) 208. A dynamically linked library is a library which resides on a secondary storage device and is loaded into a computer program at run time to perform processing. The UI 202 is a screen-oriented process that interacts with a user. The UI 202 receives input from the user and displays to the user a ranked list of help topics on the display 108. The engine module 204 is invoked by the UI 202 and, upon invocation, performs partial analysis on the user input, accesses the database 206, invokes the language DLL 208, and determines the ranked list of topics. The engine module 204 has a component 210 for identifying keywords, a component 212 for identifying metanyms associated with the keywords, a component 214 that performs definiteness analysis and a component 216 that performs capitalization analysis. The database 206 contains various information utilized by the present invention to perform partial analysis on the input. The information contained in the database will be discussed in more detail below. The language DLL 208 is a DLL that performs processing specific to a particular language. Therefore, the engine module 204 of the present invention loads the language DLL 208 into the memory 104 in order to utilize the language DLL. The language DLL 208 performs processing specific to a particular language such as dividing the user input into separate words and stripping the punctuation off of individual words. In addition, as described below, the language DLL 208 performs disambiguation analysis and therefore has a component 218 to perform this processing.

As previously stated, the database of the present invention contains various information utilized by the engine module to analyze the user input and determine what the user wants. This information consists of seven data types: topics, synonyms, metanyms, functional words, probabilities, links, and metalinks. The "topics" are the types of on-line assistance provided to a user. An example of a topic may be "create a new chart," which would provide information to a user of a spreadsheet program on how to create a chart. The topics are written off-line by the developers of the software product based on the types of problems that users usually have in utilizing the software product. Associated with each topic of the present invention is a "prior probability." The prior probability is the likelihood that a user would need a particular topic in the absence of any other information. For example, the topic "create a new chart" may have a prior probability of 0.05, whereas the topic "edit a custom chart using a macro" might have a prior probability of 0.01. The value of these two prior probabilities indicates that the "edit a custom chart using a macro" topic is much less likely to be needed by a user. The prior probabilities are created by the developers of the software product based on experience and customer research.

The "synonyms" data type are words that a user may use to refer to each topic (i.e., their help needs). For example, for the topic "create a new chart" the synonyms may include "new," "chart," "graph," "make," "create," and "picture." The synonyms for each topic are created off-line by the software product developers based on experience and customer research.

The "metanyms" data type is a general classification for synonyms. That is, a metanym is a higher level conceptual grouping of synonyms. For example, the synonyms "blue," "red," "green," and "yellow" can be grouped into the metanym "color." Another example is the synonyms "chart" and "graph" can be grouped into the metanym "chart." Metanyms can also be a higher level grouping of spelling variations, as well as different types of contractions. By utilizing metanyms, the preferred embodiment of the present invention reduces the number of words that must be considered when performing probability analysis and makes internationalization easier. Internationalization is made easier because fewer words are analyzed and the relationship between synonyms and metanyms generally do not change between languages. Thus, the relationship between synonyms and metanyms is said to be language independent. Metanyms are created off-line by the software developers based on experience and customer research.

The "functional words" data type is a grouping of common articles, possessives, demonstratives, prepositions, and other similar words. Functional words are used in definiteness analysis to determine the form of a word. For example, the word "my" in the phrase "my chart" indicates that "chart" is in the definite form, whereas the word "a" in the phrase "a chart" implies that "chart" is in the indefinite form. The list of functional words comes from the experience of the software developers, as well as customer research.

The "probabilities" data type indicates the likelihood that a user will use a particular metanym to identify a topic. For example, if a customer wants the "create a new chart" topic, there is a high probability that the user will use the word "chart" in the input. However, if the user wants the "print a document" topic, there is a much lower probability that the user will use "chart" in the input. The probabilities are created off-line based on the experience of the software developers and customer research.

The "links" data type is a connection between a metanym and a topic. Therefore, a link is used to indicate that a metanym may be used to refer to a topic. A "link relevance" is maintained as part of the link data type. The link relevance is an indication of the expectation that a metanym will be used in a definite form, an indefinite form, or a neutral form when a user requests the linked topic. For example, it is more likely when a user requests the "create a new chart" topic that a user will use the indefinite form as opposed to the definite form, because the chart does not exist yet. Links are created based on the experience of the software developers and customer research. The "metalinks" data type is used to link synonyms with the associated metanym. As with all other data types, metalinks are created off-line using the experience of the software developers and customer research.

Figure 3:
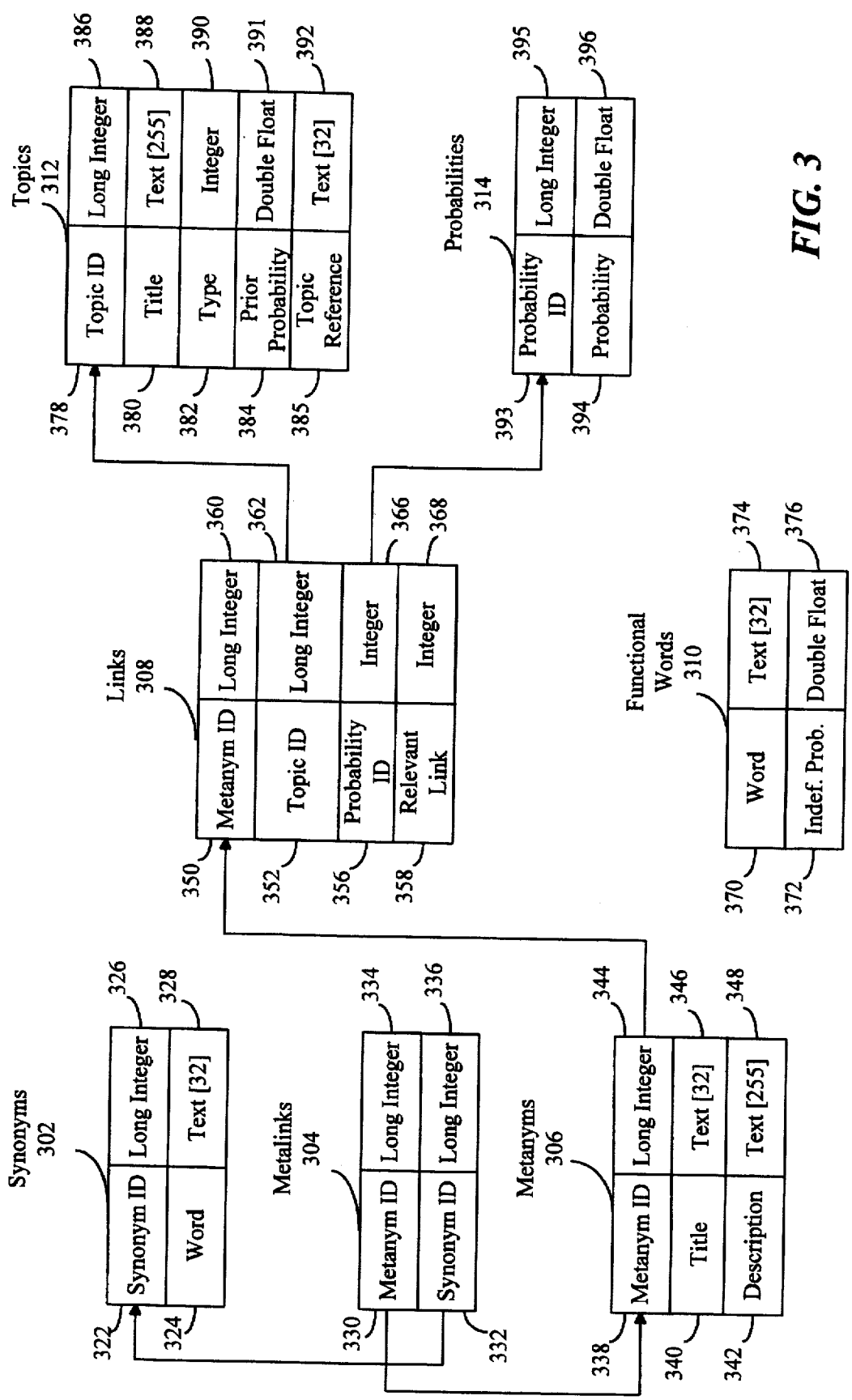
FIG. 3 depicts the record types utilized by the database of the preferred embodiment of the present invention.

The database 206 stores records of all of the previously described data types. FIG. 3 depicts the types of records utilized by the database 206 of the present invention. The database 206 contains seven types of records: a synonym record 302, a metalink record 304, a metanym record 306, a link record 308, a topic record 312, a probability record 314, and a functional word record 310. The synonym record 302 contains a synonymID 322 and a word 324. The synonymID 322 refers to a metalink record 304 and is of type long integer 326. The word 324 is the actual synonym and is contained in an array of two hundred fifty-five characters 328.

The metalink record 304 contains a metanymID 330 and a synonymID 332. The metanymID 330 refers to an associated metanym record 306 and is of type long integer 334. The synonymID refers to an associated synonym record 302 and is of type long integer 336. By using metalink records, many synonym records may be associated with a metanym record.

The metanym record 306 contains a metanymID 338, a title 340, and a description 342. The metanymID 338 is used to link the metalink record 304, the metanym record 306, and the link record 308 together and is of type long integer 344. The title 340 is the actual metanym and is an array of forty characters 346. The description 342 is an array of two hundred fifty-five characters 348 containing a textual description of the associated metanym.

The link record 308 contains a metanymID 350, a topicID 352, a probabilityID 356, and a relevantLink 358. The metanymID 350 refers to the associated metanym record 306 and is of type long integer 360. The topicID 352 is a reference to the associated topic record 312 and is of type long integer 362. The probabilityID 356 is a reference to the associated probability record 314 and is of type integer 366. The relevant link 358 is of type integer 368 and contains the preferable form of the associated metanym 306 (i.e., definite, indefinite, or neutral). By using link records, many metanym records may be associated with a topic record.

The topic record 312 contains a topicID 378, a title 380, a type 382, a prior probability 384 and a topicReference 385. The topicID is of type long integer 386 and is a reference from the associated link record 308 to the topic record 312. The title 380 is an array of two hundred fifty-five characters 388 containing the heading of the topic. The type 382 is of type integer 390 and contains the type of the topic. The type of the topic is an indication of whether the topic is a "HowDoI" or "WhatIs" topic. A HowDoI topic contains procedural information that provides a user with step-by-step instructions on how to do something. A WhatIs topic contains a description of various features. That is, a WhatIs topic describes what a feature is, not how to use the feature. The prior probability 384 is of type double float 391 and contains the prior probability for the associated topic 312. The topicReference 385 is an array containing a reference to the information for the topic. For example, the information may be contained in a file or the associated software product. If the information is contained in a file, the topicReference 385 contains the file name. If the information is contained in the associated software product, the topicReference 385 contains a reference to a function within the associated software product which will display the information. Although the information has been described as being in a file or the associated software product, one skilled in the art will appreciate that the information for a topic may be provided by other processes or devices.

The probability record 314 contains a probabilityID 393 and a probability 394. The probabilityID 393 is a reference from the associated link record 308 to the probability record 314 and is of type long integer 395. The probability 394 is of type double float 396 and contains the likelihood that a user will use the associated metanym 306 to indicate the topic 312.

The functional word record 310 contains a word 370 and an indefinite probability 372. The word 370 is an array of thirty-two characters and contains the actual functional word. The indefinite probability 372 is of type double float 376 and contains the probability that the existence of the word 370 indicates that a following word is in an indefinite form.

Figure 4:
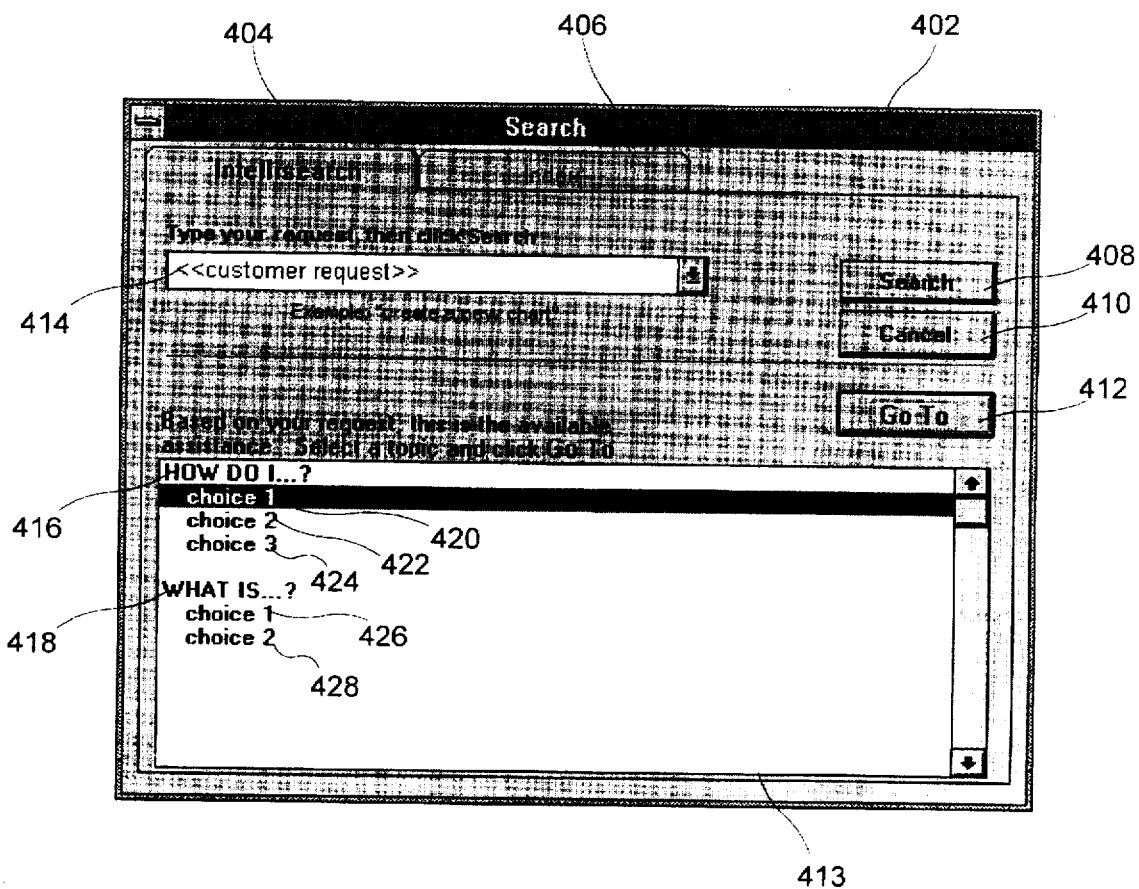
FIG. 4 depicts the screen presented to the user by the user interface process of the preferred embodiment of the present invention.

FIG. 4 depicts the screen 402 presented to the user by the UI 202 upon invoking the on-line help system of the present invention. The screen 402 contains an intellisearch tab 404 and an index tab 406. However, one skilled in the art will appreciate that other tabs may be used. If the user selects the index tab 406, the user is presented with a listing of all help topics provided by the on-line help system in a conventional manner. That is, the user may select a help topic and view the information contained therein. However, if the user selects the intellisearch tab 404, the user invokes the present invention. The intellisearch tab 404 has an input field 414, a search button 408, a cancel button 410, a GoTo button 412, and a display area 413. The input field 414 is utilized by the user to input a request. After inputting a request, the user may select the search button 408 or the cancel button 410. If the user selects the search button 408, the present invention analyzes the user input and displays a list of help topics to the user in the display 413. If the user selects the cancel button 410, the on-line help system is canceled. The display 413 contains a HowDoI section 416 and a WhatIs section 418. The HowDoI section 416 displays HowDoI topics 420, 422, 424 and the WhatIs section 418 displays WhatIs topics 426, 428. Although the screen 402 has been described with specific features, one skilled in the art will appreciate that additional or different features may be used.

Figure 5:
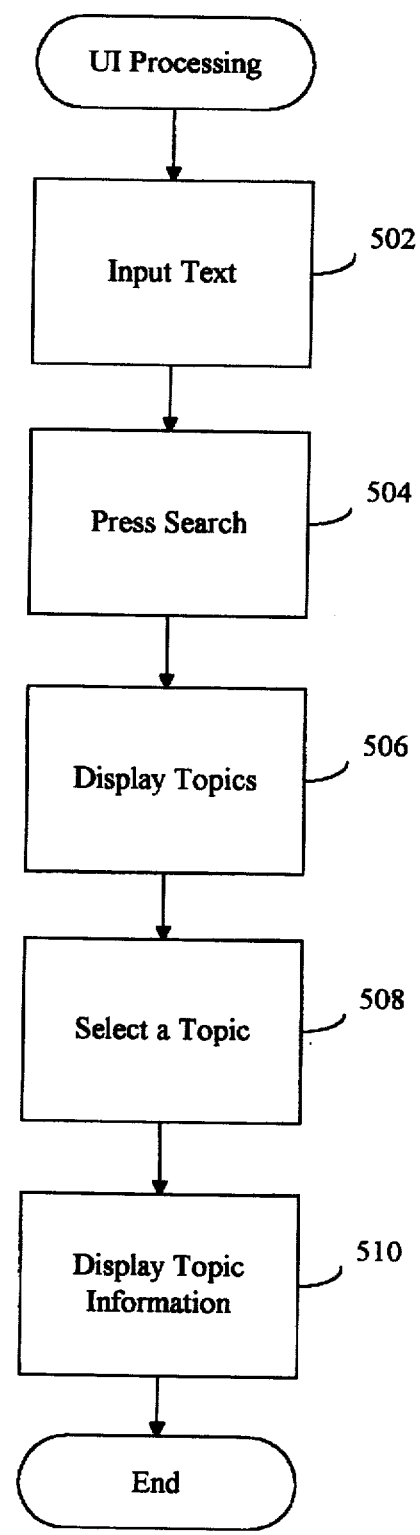
FIG. 5 depicts a flowchart of the steps performed by the user interface process of the preferred embodiment of the present invention.

FIG. 5 depicts a flowchart of the steps performed by the UI 202. The UI 202 is responsible for receiving input from a user and displaying topics according to the likelihood that the topics will help the user. The first step in the processing of the UI 202 is the user inputs text into the input field 414 (step 502). The user then presses the search button 408 (step 504). After pressing the search button 408, the UI 202 invokes the engine module to analyze the input and determine a ranked list of topics to help the user. After determining the ranked list of topics, the UI 202 displays the list of topics to the user (step 506). The user then selects a topic (step 508). After selecting a topic and pressing the GoTo button 412 or double-clicking on the topic, the UI 202 accesses the information for the selected topic, by utilizing the topicReference 385 in the topic record 312, and displays the information to the user (step 510).

Figure 6A:
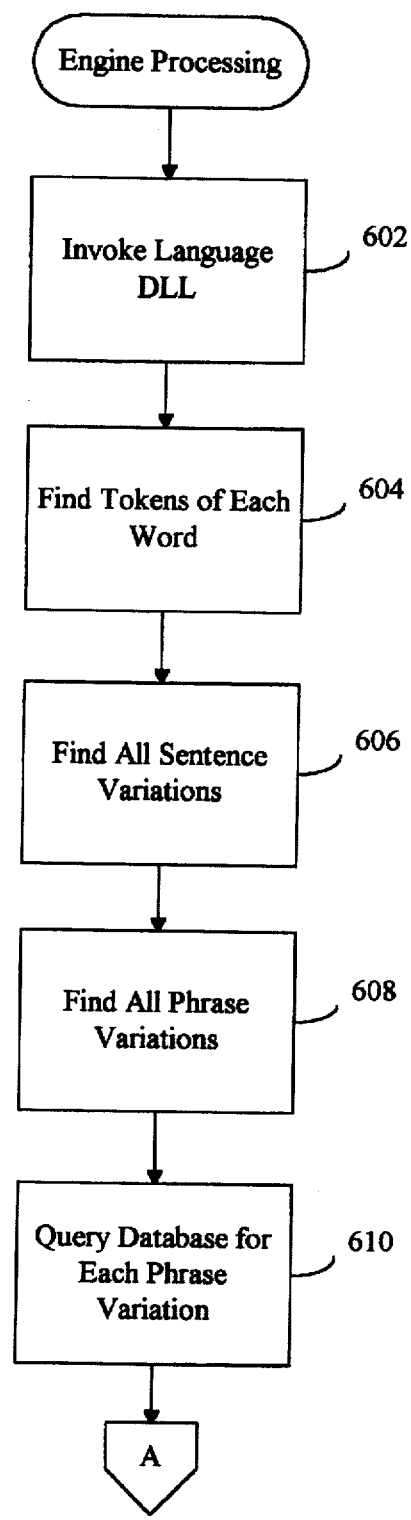
FIGS. 6A, 6B and 6C depict a flowchart of the steps performed by the engine of the preferred embodiment of the present invention, where the engine performs definiteness analysis, capitalization analysis and probability boosting and punishment.
Figure 6B:
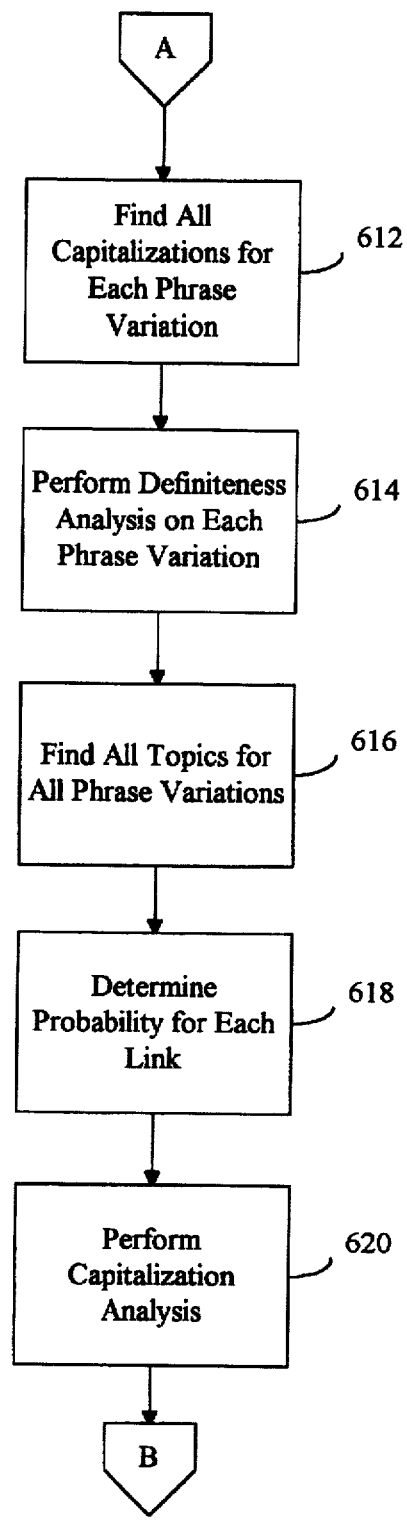
Figure 6C:
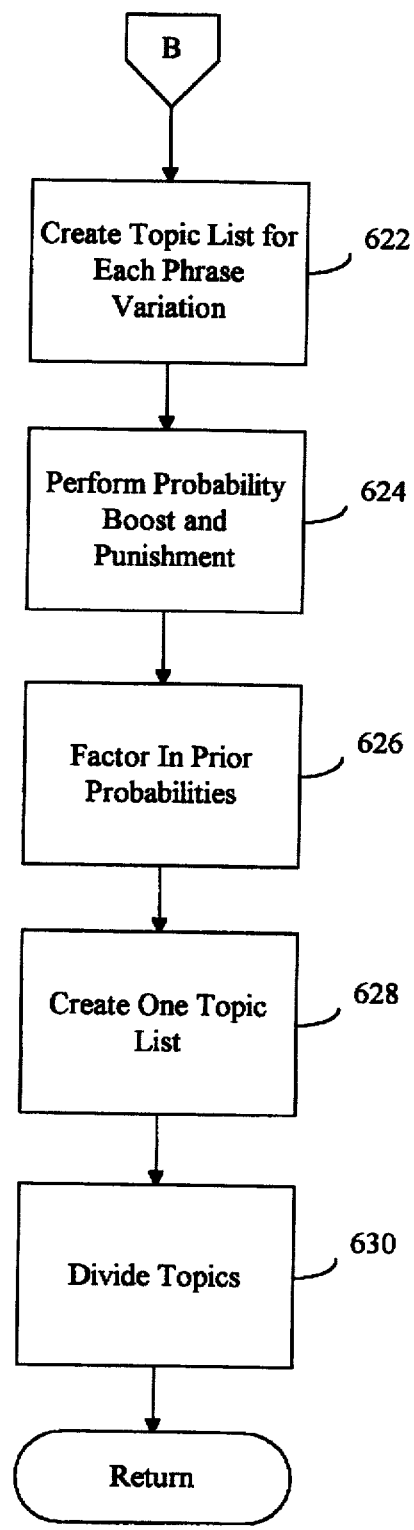

FIGS. 6A, 6B and 6C depict a flowchart of the steps performed by the engine module of the present invention. The engine module is invoked by the UI with the input and returns a ranked list of topics to the UI. The first step performed by the engine module is to invoke the language DLL (step 602). The language DLL receives the input, strips white space from within the input, strips the punctuation for each word, divides the input into individual words, and performs other language-specific processing such as noun-verb disambiguation. The language DLL will be discussed in more detail below. After invoking the language DLL, the language DLL returns the modified input to the engine module and the engine module finds the tokens for each word (step 604). There may be more than one token for each word in the input. The tokens for a word comprise the lemma for the word and another word that has a specific meaning within the context of the help system ("context word"). The lemma for a word is the uninflected form of the word. Thus, verbs are converted to the infinite form and plural words are converted to the singular form. For example, the lemma of "ran," "runs," and "running" is "run." An example of a context word can be seen in the tokens for the word "recalculate" when the help system is for a spreadsheet program. Although the lemma for "recalculate" is "calculate," there is another form of the word, a context word, that has a specific meaning that should not be overlooked, "recalculate." This form of the word has a specific meaning within a spreadsheet program (i.e., to recalculate the cells in a spreadsheet). If no token is found for a word, the word itself is used as the token. When finding the tokens for each word, the word is converted to all lower case letters and two queries are performed on the database. The developers initially create database records containing all of the words that they think a user will use. These words are stored using the uninflected form of the word. These database records are then run through an automated process that creates database records containing the inflected forms of the words. The database records containing the inflected forms are created so as to refer to the database records containing the uninflected form. In addition, the developer creates database records that contain context words. Thus, a first query of the database utilizing an inflected form of a word will yield the lemma. A second query is then performed on the inflected form of the word to determine if it matches a context word. If it does, the context word is returned.

For example, if the user input "Lining up my Words," the engine module associates a list of tokens with each word in the input. Therefore, after this step, the engine module creates the following:

| Input: | Lining | up | my | Words |
|---|---|---|---|---|
| Tokens: | lining line | up | my | word |

The word "Lining" has two tokens: "lining" and "line." The word "Words" has one token, "word."

The engine module then finds all sentence variations for the input (step 606). In this context, the term "sentence" refers to the text input by the user. This step groups the words into all possible combinations to create all possible sentence variations. Each group of words is referred to as a "phrase." For example, the sentence "lining up my words" has eight sentence variations:

| Input: | Lining up my Words |
|---|---|
| sentence variations: | (lining) (up) (my) (words) |
| | (lining) (up) (my words) |
| | (lining) (up my) (words) |
| | (lining) (up my words) |
| | (lining up) (my) (words) |
| | (lining up) (my words) |
| | (lining up my) (words) |
| | (lining up my words) |

After all sentence variations have been found, the engine module finds all "phrase variations" (step 608). For each phrase in each sentence variation, the engine utilizes the token lists for each word to come up with phrase variations. That is, a list of possible variations is created for each phrase based on the list of tokens for each word. Remember, a phrase is a group of words in a sentence variation and a phrase variation is a variation of a phrase utilizing the tokens for the words in the phrase. At this point, the list of tokens attached to each individual word is discarded and henceforth the engine module only deals with phrase variations for each phrase.

For example, the sentence variation (Lining up) (my) (Words) would have the following phrase variations:

| Sentence variation: | (Lining up) | (my) | (Words) |
|---|---|---|---|
| phrase variations: | (lining up) (line up) | | (word) |

In this example, the word "Lining" has two tokens: "lining" and "line," thus the phrase "Lining up" has two phrase variations: "lining up" and "line up." The phrase "my" is a single token, so there is no phrase variation. The phrase "Words" has one token and, therefore, one phrase variation, "word." Remember, the token for each word is in lower case.

After finding all phrase variations, the engine module queries the database for each phrase variation (step 610). In this step, the engine module does a search on all synonym records in the database to determine if each phrase variation is found. The synonym records contain all keywords recognized by the present invention. If a phrase variation has a matching synonym record, the phrase variation is kept and the associated metanym record is stored with the phrase variation. If, however, a phrase variation does not have a matching synonym record, the phrase variation is no longer considered and is deleted. At the end of this step, if a phrase has no more associated phrase variations (i.e., the phrase variations have all been deleted), the entire sentence variation is deleted and is no longer examined. Therefore, this step removes some sentence variations from analysis.

Next, the engine module finds all capitalizations for each phrase variation (step 612 in FIG. 6B). In this step, a query is performed on the synonym records in the database with the phrase variations converted to having an initial letter capitalized. All matches on the synonym records in the database are added to the phrase variations for a sentence variation that is being analyzed. At this point, there have been two queries on the synonym records in the database, the first query was with each word in the phrase variation being the same case (where all the letters are lower case), and the second query was with each word in the phrase variation being capitalized (i.e., the first character is capitalized). For each spelling found for each phrase variation, the alternate spellings are attached to the phrase variation. In addition, this step marks a spelling of a phrase variation as "preferred" if the original spelling of the phrase matches a synonym record in the database exactly. For example, if the original capitalization of the phrase were lower case and the lower case form of the phrase variation matches a synonym record in the database, the lower case form of the phrase variation is marked as preferred. This "preference" is described in further detail below. Consider the following example:

| Sentence variation | (Lining up) | (my) | (words) |
|---|---|---|---|
| Phrase variations | (lining up) (line up) | | (word) |
| Additional capitalization phrase variation | | | (Word) |

In this example, the search on the synonym records of the database revealed only one alternative spelling for a phrase variation. This phrase variation is "word" and had an alternative spelling of "Word." This alternative spelling now becomes a phrase variation to be analyzed with all other phrase variations for this sentence variation.

The engine module then performs definite analysis on each phrase variation (step 614). In this step, for each phrase for a sentence variation, the functional word records are queried in the database. If the phrase is found in a functional word record, the phrase is marked as a functional word and the phrase is considered to modify each phrase after it that is not a functional word. The indefinite probability for each phrase is then determined by multiplying all of the preceding functional word indefinite probabilities together. The indefinite probability for a functional word is within the range of 0 to 1. If there are no functional word probabilities before a phrase, the indefinite probability is set to a predefined value (e.g., 0.6). For example, if a sentence variation were "put color on my chart" and each word was a phrase, the words "on" and "my" are functional words as revealed by a query to the functional words records of the database. The words "put" and "color" are not modified by the functional words because they appear before the functional words. Conversely, the word "chart" is modified by both functional words since "chart" appears after the functional words. Also, the probability for all preceding functional words is distributed across all following non-functional words that are encountered before a functional word. Thus, if the sentence variation were "put color on my data chart," both "data" and "chart" are modified by the functional words "on" and "my." In this example, the indefinite probability for "put" and "color" would be 0.6 by utilizing the predefined value. If the indefinite probability, as found in the indefProb field of the functional word records, for "on" and "my" were 0.4 and 0.25, respectively, the indefinite probability for "chart" and "data" would be 0.1 (i.e., 0.4×0.25).

After performing definite analysis, the engine module finds all topics for each phrase variation by accessing the link records referred to by the associated metanym records of the phrase variations (step 616). The metanym record for each phrase variation was stored with the phrase variation in step 610. In this step, each phrase variation will have a list of topics associated with the phrase variation. All phrase variations having multiple capitalizations will have a list of topics for each capitalization.

Consider an example where two sentence variations are currently being analyzed. The other six of the original sentence variations have been removed from consideration in step 610 when a phrase had phrase variations that were not found in the synonym records of the database. The topics shown below indicate the topicID, the link probability, and the relevantLink type, respectively. In addition, example indefinite probabilities for each phrase are depicted as calculated from step 614.

| Sentence variation 1: | (Lining) | (up) | (my) | (Words) |
|---|---|---|---|---|
| indefinite probability | 0.6 | 0.6 | (NA) | 0.25 |
| phrase variations | line | up | (NA) | word |
| topics | (345, 0.9, def) (347, 0.75, def) (100, 0.1, indef) | (346, 0.75, neutral) (347, 0.2, neutral) | (NA) | (28, 0.6, neutral) (300, 0.9, def) (935, 0.4, indef) |
| phrase variations topics | | | | Word (12, 0.9, neutral) (28, 0.1, neutral) |

| Sentence variation 2: | (Lining up) | (my) | (Words) |
|---|---|---|---|
| indefinite probability | 0.6 | (NA) | 0.25 |
| phrase variations | line up | (NA) | word |
| topics | (345, 0.1, def) (935, 0.5, def) | | (28, 0.6, neutral) (300, 0.9, def) (935, 0.4, indef) |
| phrase variations topics | | | Word (12, 0.9, neutral) (28, 0.1, neutral) |

The engine module then determines the probability for each link between a topic and a phrase variation (step 618).

To perform this step, the engine module invokes a link transform function with three parameters: the indefinite probability of the phrase in the sentence variation (as calculated in step 614), the probability of the link as found in the probability field of the probability record, and the relevant link type as found in the relevant link field of the associated metanym record. The link transform function then returns a probability for the link. The link transform function is described in Code Table No. 1.

Code Table No. 1

The link transform function utilizes a term "P'(C|T)" which refers to the new link probability being calculated, and the term "P(C|T)" is the current probability contained in the link record, where "T" refers to the topic and "C" refers to the phrase variation.

Constants

X=0.01% {0.01 is the leak term, 6 is a constant}

L(I)=P(C|T)*(((1−P(I))*X)+P(I))

L(D)=P(C|T)*((P(I)*X)+(1−P(I)))

L(N)=(L(D)*P(D|IDT))+(L(I)*P(I|IDT))

Where "P(I)" is the parameter containing the indefinite probability for the phrase.

Where "P(I|IDT)" is the probability that a topic is indefinite if the topic is in the database and the topic is not neutral. This probability is calculated by dividing the number of indefinite topics by the number of indefinite and definite topics.

Where "P(D|IDT)" is the probability that a topic is definite if the topic is in the database and the topic is not neutral. This probability is calculated by dividing the number of definite topics by the number of indefinite and definite topics.

Algorithm

If the relevant link type is indefinite,

P'(C|T)=L(I)

Else if the relevant link type is definite,

P'(C|T)=L(D)

Else if the relevant link type is neutral,

P'(C|T)=L(N)

Else the relevant link is unknown

P'(C|T)=P(I|KT)*L(I)+P(D|KT)*L(N|KT)*L(N)

Where "P(D|KT)" is the probability that a topic is indefinite which is the number of indefinite topics in the database divided by the total number of topics (i.e., known topics) in the database (e.g., 0.04).

Where "P(D|KT)" is the probability that a topic is definite which is the number of definite topics in the database divided by the total number of topics in the database (e.g., 0.9).

Where "P(N|KT)" is the probability that a topic is neutral, which is the number of neutral topics in the database divided by the total number of topics in the database (e.g., 0.06).

The following depicts the new probability calculated for the links.

| Sentence variation 1: | (Lining) | (up) | (my) | (Words) |
|---|---|---|---|---|
| phrase variations topics | line (345, 0.6) (347, 0.45) (100, 0.05) | up (346, 0.65) (347, 0.1) | (NA) (NA) | word (28, 0.4) (300, 0.8) (935, 0.1) |
| phrase variations topics | lining (5, 0.6) | | | Word (12, 0.7) (28, 0.07) |
| Sentence variation 2: | (Lining up) | | (my) | (Words) |
| phrase variations topics | line up (345, 0.05) (935, 0.2) | | (NA) | word (28, 0.4) (300, 0.8) (935, 0.1) |
| phrase variations topics | | | | Word (12, 0.7) (28, 0.07) |

After determining the probability for each link, the engine performs capitalization analysis on each phrase variation that was found to have multiple capitalizations (step 620). The purpose of this step is to determine the probability that either form was intended by the user and then to average the probabilities for each form accordingly. In this step, the two topic lists for each phrase variation with multiple capitalizations is merged into a single list. In performing this step, two constants are used. The first constant "P(MS|TM)" is an indication of the probability that the user typed the upper-case (i.e., initial capitalization) form of a word when really meaning to type the same case form (e.g., 0.1). The Second constant "P(MM|TS)" is an indication of the probability that the user typed the same case form when meaning to type the initial capitalization form (e.g., 0.25). In merging the two lists, a single list is created containing each topic that is in either of the two lists. For each entry in the single list, two probabilities are used, one for each form. If a topic was not found in one form, a leak probability of 0.01 is used. Otherwise, both probabilities, one for each form, are used. Pseudo code describing this step is provided in Code Table No. 2.

Code Table No. 2

Where "P(T|SL)" is the current probability of the probability record for the lower case form, where "P(T|ML)" is the current probability of the probability record for the initial capitalization form, and where "P(T|L)" is the newly calculated probability of the link for the phrase variation.

```
LEAK_TERM=0.01;
Create Single List of topics;
For each topic in the list
{
    /* if either form does not refer to a topic, use the LEAK_TERM */
    If (P(T|SL)==Ø)
        P(T|SL)=LEAK_TERM;
    If (P(T|ML)==Ø)
        P(T|ML)=LEAK_TERM;
    /* choose the correct formula */
    If neither form is preferred
        P(T|L)=(P(T|SL)+P(T|ML))/2
    If the lower case form is preferred
        P(T|L)=P(T|SL)*(1−P(MM|TS))+P(T|ML)*P(MM|TS)
    If the initial capitalization form is preferred
        P(T|L)=P(T|ML)*(1−P(MS|TM))+P(T|SL)*P(MS|TM)
}
```

For example, only the phrase variation "Word" has multiple spellings, thus, only the list of topics associated with "word" and "Word" are merged.

| topic ID | word Probability | Word Probability | New Probability |
|---|---|---|---|
| 12 | 0.01 | 0.7 | 0.355 |
| 28 | 0.4 | 0.07 | 0.235 |
| 300 | 0.8 | 0.01 | 0.405 |
| 935 | 0.1 | 0.01 | 0.055 |

In the continuing example, neither form is preferred and the phrase variation "(word/Word)" indicates the merger of the two topic lists.

| Sentence variation 1: | (Lining) | (up) | (my) | (Words) |
|---|---|---|---|---|
| phrase variations topics | line (345, 0.6) (347, 0.45) (100, 0.05) | up (346, 0.65) (347, 0.1) | (NA) | (word/Word) (12, 0.355) (28, 0.235) (300, 0.405) (935, 0.055) |
| phrase variations topics | lining (5, 0.6) | | | |

| Sentence variation 2: | (Lining up) | (my) | (Words) |
|---|---|---|---|
| phrase variations topics | line up (345, 0.05) (935, 0.2) | (NA) | (word/Word) (12, 0.355) (28, 0.235) (300, 0.405) (935, 0.055) |

Next, the engine module creates a single topic list for each phrase variation (step 622 in FIG. 6C). In this step, the topic lists for all phrase variations for a phrase are merged. In order to merge the lists, the engine averages the probabilities in each list. In order to perform this step, a list is created containing all topics appearing in any of the topic lists for the phrase variations for a phrase. Then, for each topic in the new list, the probabilities for each phrase variation are added together and then divided by the number of phrase variations. If there is no probability for a phrase variation for a topic, the engine module utilizes the leak term (i.e., 0.01). The result of this step is to create a list of topics for each phrase in a sentence variation.

In the continuing example, "lining" is the only phrase with multiple phrase variations. The topic lists are merged as follows:

| topic ID | (line) Probability | (lining) Probability | New "Lining" Probability |
|---|---|---|---|
| 5 | 0.01 | 0.6 | 0.305 |
| 100 | 0.05 | 0.01 | 0.03 |
| 345 | 0.6 | 0.01 | 0.305 |
| 374 | 0.45 | 0.01 | 0.23 |

Therefore, each phrase in each sentence variation has one topic list.

| Sentence variation 1: | (Lining) | (up) | (my) | (Words) |
|---|---|---|---|---|
| topics | (5, 0.305) (100, 0.03) (345, 0.305) | (346, 0.65) (347, 0.1) | (NA) | (12, 0.355) (28, 0.235) (300, 0.405) |

-continued

| | (347, 0.23) | | (935, 0.055) |
|---|---|---|---|
| Sentence variation 2: | (Lining up) | (my) | (Words) |
| topics | (345, 0.05) (935, 0.2) | (NA) | (12, 0.355) (28, 0.235) (300, 0.405) (935, 0.055) |

The next step performed by the engine module is to perform probability boosting and probability punishment (step 624). Probability boosting and probability punishment is performed by merging all of the topic linked lists for each phrase in a sentence variation into one topic list for the entire sentence variation. In order to perform this step, one list of topics is created per sentence variation. This list of topics contains one entry for every topic that appears in any of the list of topics for each phrase. After creating this one list, for each topic in the list, the probability for each phrase linked to the topic is multiplied together. If a phrase is not linked to the topic, the leak term is used. At the end of this step, each sentence variation has a single list of topics.

For example, for the first sentence variation:

| topic ID | Lining | up | my | Words | Resulting Score |
|---|---|---|---|---|---|
| 5 | 0.305 | 0.01 | 0.01 | 0.01 | $3.05 \times 10^{-7}$ |
| 12 | 0.01 | 0.01 | 0.01 | 0.355 | $3.55 \times 10^{-7}$ |
| 28 | 0.01 | 0.01 | 0.01 | 0.235 | $2.35 \times 10^{-7}$ |
| 100 | 0.03 | 0.01 | 0.01 | 0.01 | $3 \times 10^{-8}$ |
| 300 | 0.01 | 0.01 | 0.01 | 0.405 | $4.05 \times 10^{-7}$ |
| 345 | 0.305 | 0.01 | 0.01 | 0.01 | $3.05 \times 10^{-7}$ |
| 346 | 0.01 | 0.65 | 0.01 | 0.01 | $6.5 \times 10^{-7}$ |
| 347 | 0.23 | 0.1 | 0.01 | 0.01 | $2.3 \times 10^{-6}$ |
| 935 | 0.01 | 0.01 | 0.01 | 0.055 | $5.5 \times 10^{-8}$ |

For the second sentence variation:

| topic ID | Lining up | my | Words | Resulting Score |
|---|---|---|---|---|
| 5 | 0.01 | 0.01 | 0.01 | $1 \times 10^{-6}$ |
| 12 | 0.01 | 0.01 | 0.355 | $3.55 \times 10^{-5}$ |
| 28 | 0.01 | 0.01 | 0.235 | $2.35 \times 10^{-5}$ |
| 100 | 0.01 | 0.01 | 0.01 | $1 \times 10^{-6}$ |
| 300 | 0.01 | 0.01 | 0.405 | $4.05 \times 10^{-5}$ |
| 345 | 0.05 | 0.01 | 0.01 | $5 \times 10^{-6}$ |
| 346 | 0.01 | 0.01 | 0.01 | $1 \times 10^{-6}$ |
| 347 | 0.01 | 0.01 | 0.01 | $1 \times 10^{-6}$ |
| 935 | 0.2 | 0.01 | 0.055 | $1.1 \times 10^{-4}$ |

After creating a topic list for each sentence variation, the engine module factors in the prior topic probabilities (step 626). In this step, the prior probability for each topic as found in the topic record of the database is multiplied by the current score.

For the first sentence variation:

| topic ID | Current Score | Prior Probability | Result Score |
|---|---|---|---|
| 5 | $3.05 \times 10^{-7}$ | 0.0012 | $3.66 \times 10^{-10}$ |
| 12 | $3.55 \times 10^{-7}$ | 0.005 | $1.775 \times 10^{-9}$ |
| 28 | $2.35 \times 10^{-7}$ | 0.02 | $4.7 \times 10^{-9}$ |
| 100 | $3 \times 10^{-8}$ | 0.01 | $3 \times 10^{-10}$ |
| 300 | $4.05 \times 10^{-7}$ | 0.0072 | $2.916 \times 10^{-9}$ |
| 345 | $3.05 \times 10^{-7}$ | 0.0004 | $1.22 \times 10^{-10}$ |

-continued

| topic ID | Current Score | Prior Probability | Result Score |
|---|---|---|---|
| 346 | $6.5 \times 10^{-7}$ | 0.009 | $5.85 \times 10^{-9}$ |
| 347 | $2.3 \times 10^{-6}$ | 0.01 | $2.3 \times 10^{-8}$ |
| 935 | $5.5 \times 10^{-8}$ | 0.0075 | $4.125 \times 10^{-10}$ |

For the second sentence variation:

| topic ID | Current Score | Prior Probability | Result Score |
|---|---|---|---|
| 5 | $1 \times 10^{-6}$ | 0.0012 | $1.2 \times 10^{-9}$ |
| 12 | $3.55 \times 10^{-5}$ | 0.005 | $1.775 \times 10^{-7}$ |
| 28 | $2.35 \times 10^{-5}$ | 0.02 | $4.7 \times 10^{-7}$ |
| 100 | $1 \times 10^{-6}$ | 0.01 | $1 \times 10^{-8}$ |
| 300 | $4.05 \times 10^{-5}$ | 0.0072 | $2.916 \times 10^{-7}$ |
| 345 | $5 \times 10^{-6}$ | 0.0004 | $2 \times 10^{-9}$ |
| 346 | $1 \times 10^{-6}$ | 0.009 | $9 \times 10^{-9}$ |
| 347 | $1 \times 10^{-6}$ | 0.01 | $1 \times 10^{-8}$ |
| 935 | $1.1 \times 10^{-4}$ | 0.0075 | $8.25 \times 10^{-7}$ |

After factoring in the prior probabilities, the engine module creates a single master topic list (step 628). The master topic list contains all topics in any of the topic lists for each sentence variation. After creating the master topic list, for each topic in the master list, the geometric mean for the scores for each topic is obtained. If a topic does not appear in a sentence variation topic list, the leak probability term is used. At the end of this step, one master topic linked list is provided for all sentence variations.

For example,

| topic ID | Sentence Variation 1 | Sentence Variation 2 | Master Topic List Score |
|---|---|---|---|
| 5 | $3.66 \times 10^{-10}$ | $1.2 \times 10^{-9}$ | $4.392 \times 10^{-19}$ |
| 12 | $1.775 \times 10^{-9}$ | $1.775 \times 10^{-7}$ | $3.1506 \times 10^{-16}$ |
| 28 | $4.7 \times 10^{-9}$ | $4.7 \times 10^{-7}$ | $2.209 \times 10^{-15}$ |
| 100 | $3 \times 10^{-10}$ | $1 \times 10^{-8}$ | $3 \times 10^{-18}$ |
| 300 | $2.916 \times 10^{-9}$ | $2.916 \times 10^{-7}$ | $8.5031 \times 10^{-16}$ |
| 345 | $1.22 \times 10^{-10}$ | $2 \times 10^{-9}$ | $2.44 \times 10^{-19}$ |
| 346 | $5.85 \times 10^{-9}$ | $9 \times 10^{-9}$ | $5.265 \times 10^{-17}$ |
| 347 | $2.3 \times 10^{-8}$ | $1 \times 10^{-8}$ | $2.3 \times 10^{-16}$ |
| 935 | $4.125 \times 10^{-10}$ | $8.25 \times 10^{-7}$ | $3.4031 \times 10^{-16}$ |

The engine module next divides all topics according to the topic type (step 630). In this step, the engine divides the master topic list into two lists: a HowDoI list and a WhatIs list. After creating the two lists, the lists are returned to the UI.

As stated above, the language DLL performs language-specific processing. This language-specific processing includes dividing the input into individual words and performing noun-verb disambiguation analysis. Dividing the input into individual words is language-specific, since this processing depends on the particular language. For example, in English, all that is required is to strip punctuation and divide the input into individual words based on white space within the input. However, this processing may be more complicated for other languages. For instance, in French there are clitics, such as "L'enfant," that use a combination of both an article and a noun and, in German, there are compound words such as "koptzeilenabsatz" which require special processing. Therefore, the language DLL is language-specific.

Noun-verb disambiguation analysis refers to determining the usage of a word. In performing noun-verb disambiguation analysis, the preferred embodiment of the present invention determines the usage of a word in the input and then identifies the word to indicate the usage. By performing noun-verb disambiguation analysis in this way, the analysis has little impact on the other components of the preferred embodiment. That is, all language-specific processing in the preferred embodiment is modularized and may be replaced easily. This modularity allows for internationalization. For the noun-verb disambiguation analysis to work effectively, metanym records should be created for each usage of each word in the noun-verb file, which is described below.

Figure 7:
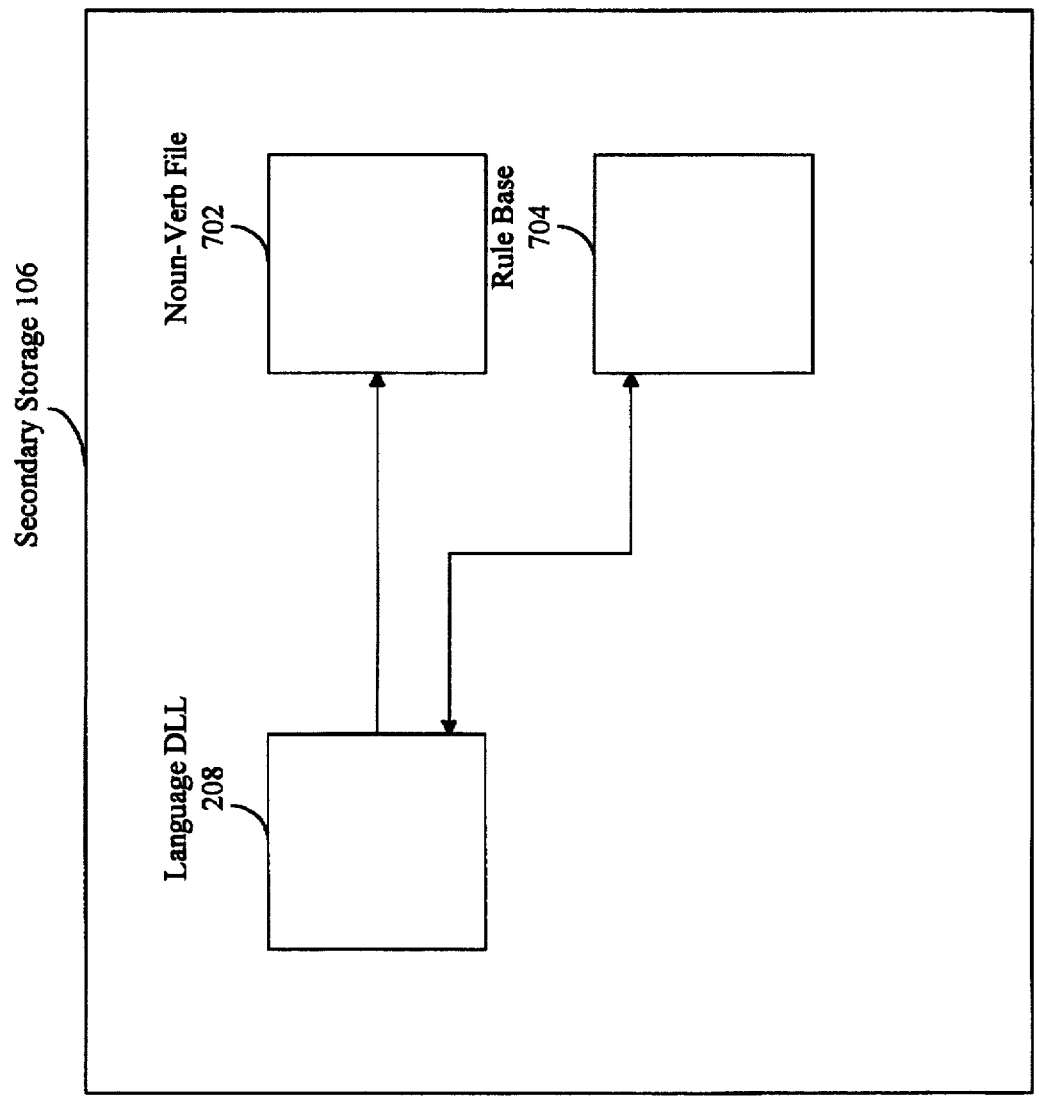
FIG. 7 depicts a more detailed diagram of the language DLL of the preferred embodiment of the present invention.

In performing noun-verb disambiguation analysis, as shown in FIG. 7, the preferred embodiment utilizes a noun-verb file 702 as well as a rule-base 704. The noun-verb file 702 contains a list of words in the English language that can be used as both a noun or a verb. The list of words used in the noun-verb file of the preferred embodiment are shown below:

Noun-Verb File
author
catalog
email
form
indent
link
overlay
outline
type
shortcut
strikethrough
underline
update
setup
page number
space Although a specific list of words has been described, one skilled in the art will appreciate that additional or different words may be used in the noun-verb file 702.

The rule-base 704 is a storage mechanism that accepts two parameters, performs "adjacency analysis" to determine the usage of a word, and provides a return value indicating the usage of the word being evaluated. The parameters of the rule-base 704 are the immediately preceding word and the immediately following word (as found in the input) to the word being evaluated. After invoking the rule-base 704 with the parameters, the rule-base performs adjacency analysis by analyzing the parameters to determine the usage of the word being evaluated. After determining the usage of the word being evaluated, the rule-base 704 returns a return value of NOUN, VERB or UNIDENTIFIED. The return values NOUN and VERB identify the usage of the word and the return value UNIDENTIFIED indicates that the rule-base was unable to identify the usage of the word. The following rules are used by the rule-base 704 to determine if a word has a verb usage:

| Preceding Word | Following Word |
|---|---|
| to | a |
| you | the |
| we | this |
| I | these |
| he | that |
| she | those |

-continued

| Preceding Word | Following Word |
|---|---|
| it | some |
| they | both |
| will | each |
| can | every |
| could | all |
| might | one |
| may | |

In using the above rules, if the preceding word passed into the rule-base as a parameter matches a word in the preceding word list above and if the following word passed into the rule-base as a parameter matches a word in the following word list above, the word being evaluated has a verb usage. The rules utilized by the rule-base 704 to determine whether a word is used as a noun follow:

| Preceding Word | Following Word |
|---|---|
| a | of |
| the | has |
| this | have |
| these | is |
| that | was |
| those | be (all forms) |
| some | will |
| both | would |
| each | can |
| every | could |
| all | might |
| one | may |

As in the case of a verb, if the parameters match a word in both columns, the word being evaluated has a noun usage. Although a number of rules have been described as being utilized by the rule-base 704, one skilled in the art will appreciate that additional or different rules may be used by the present invention.

Figure 8:
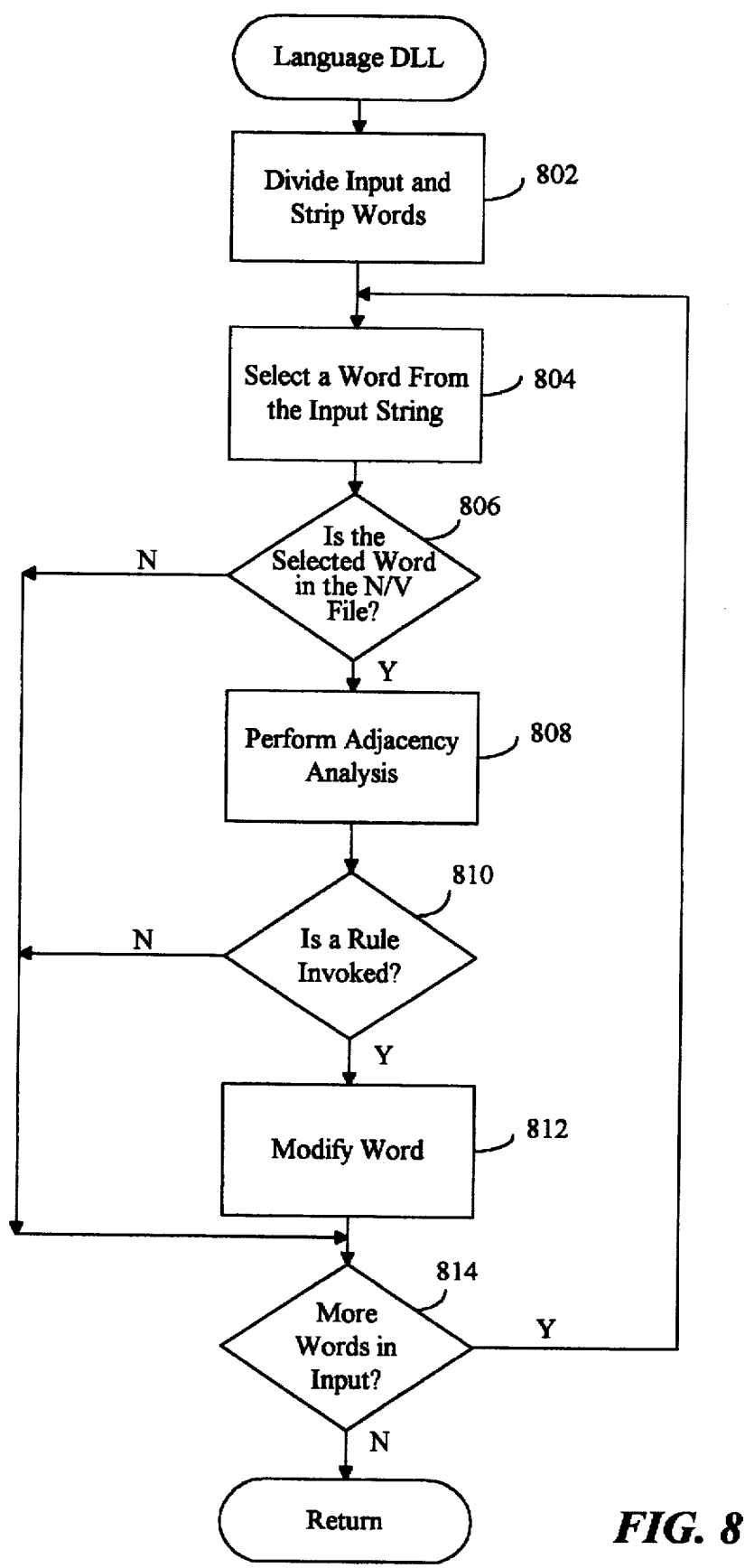
FIG. 8 depicts a flowchart of the steps performed by the language DLL of the preferred embodiment of the present invention.

FIG. 8 depicts a flowchart of the steps performed by the language DLL of the present invention. The first step of the language DLL is to divide the input into individual words and strip punctuation from the individual words (step 802). Next, the language DLL selects a word from the user input (step 804). After selecting a word, the language DLL accesses the noun-verb file to determine if the selected word is in the noun-verb file (step 806). If the selected word is not in the noun-verb file, the language DLL continues to step 814 where the language DLL determines if there are more words in the input for processing. However, if the selected word is in the noun-verb file, the language DLL performs adjacency analysis (step 808). Adjacency analysis is performed by retrieving the previous word and the following word from the input and accessing the rule-base. The rule-base then determines the usage of the selected word by returning a return value of either NOUN, VERB, or UNIDENTIFIED. The language DLL then determines if a rule in the role-base was invoked (step 810). If a rule in the rule-base was invoked, a return value of either NOUN or VERB is returned. Otherwise, a return value of UNIDENTIFIED is returned. If the rule-base returns a value of UNIDENTIFIED, the language DLL processing continues to step 814 where the language DLL determines if there are more words in the input for processing. If, however, a rule is invoked, the language DLL modifies the selected word (step 812). If the selected word is determined to be a noun, the selected word is modified by being appended with "$_n$." Otherwise, the selected word is modified by being appended with "$_v$." After modifying the word, the language DLL determines if there are more words in the input for processing (step 814). If there are more words in the input for processing, processing continues to step 804, where another word is selected for processing. If, however, no more words for processing, processing returns.

Figure 9:
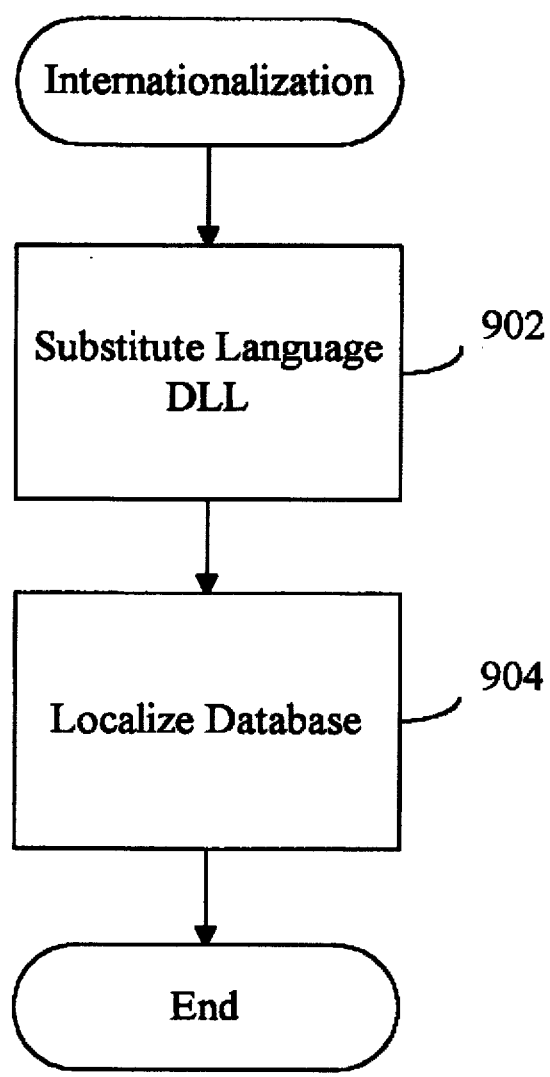
FIG. 9 depicts a flowchart of the steps performed for internationalization of the preferred embodiment of the present invention.

As previously described, the design of the preferred embodiment provides for an internationalizable free text query system. The preferred embodiment, therefore, allows for an easy porting of the present invention from one language to another language. A flowchart of the steps performed for internationalization of the preferred embodiment is depicted in FIG. 9. The first step performed in porting the preferred embodiment to a second language is substituting the language DLL (step 902). In this step, someone fluent in the second language creates a language DLL for the second language containing rules for stripping punctuation and for dividing input into individual words. Such a second language DLL may not contain noun-verb disambiguation analysis depending upon the constraints inherent with the second language. After substituting the language DLL, the database is localized (step 904). Localizing the database refers to translating the records in the database from the first language into the second language. That is, someone fluent in both the first and second language accesses the records of the database and converts the text fields from the first language into the second language (i.e., the word field of the synonym records, the word field of the function word records, and the title field of the topics records). The structure of the database of the present invention ensures that the relationship among the records of the database will not change. However, there may be additional or fewer synonyms for a particular metanym due to the nature of the second language. Typically, the only modifications to the database necessary are to translate the text fields in the records of the database. After localizing the database, the present invention may then be used for a second language.

While the present invention has been described with reference to a preferred embodiment thereof, those skilled in the art will know of various changes in form that may be made without departing from the spirit and scope of the claimed invention as defined in the appended claims.

We claim:

1. In a computer system having a plurality of help-topics for providing assistance to a user of the computer system and a free text query system for receiving input from the user indicating a selection and for generating a list of candidates for the selection, a method comprising the steps of:

receiving input comprising a plurality of words from the user indicating a selection;

providing a plurality of keywords relevant to the selection to the computer system and identifying ones of the keywords within the received input in response to receiving the input;

providing a plurality of metanyms to the computer system, wherein each of the metanyms is a general concept describing at least one of the keywords, wherein each of the metanyms is associated with a candidate help topic and determining the metanym for each of the ones of the keywords in response to identifying the ones of the keywords;

identifying the candidate help topic associated with each of the determined metanyms, wherein each candidate help topic has an associated likelihood that the selection refers to the candidate help topic;

for each identified candidate help topic, increasing the likelihood of the identified candidate help topic when each of the determined metanyms is associated with the identified candidate help topic;

decreasing the likelihood of the identified candidate help topic when each of the determined metanyms is not associated with the identified candidate help topic; and generating a list of the identified candidate help topics according to the likelihood of the identified candidate help topics.

2. In a computer system having a free text query system for receiving input from a user indicating a selection and for generating a list of candidates for the selection, a method comprising the steps of:

receiving input comprising a plurality of words from the user indicating a selection;

providing a plurality of keywords relevant to the selection to the computer system and identifying ones of the keywords within the received input in response to receiving the input;

providing a plurality of metanyms to the computer system, wherein each of the metanyms is a general concept describing at least one of the keywords and is associated with a candidate, wherein the general concept describing at least one of the keywords is not particular to a natural language, and determining the metanym for each of the ones of the keywords in response to identifying the ones of the keywords;

identifying the candidate associated with each determined metanym, wherein each candidate has an associated likelihood that the selection refers to the candidate; and generating a list of the identified candidates according to the likelihood of the identified candidates.

3. The method of claim 2 wherein each of the plurality of words has a case, wherein the step of determining the metanym includes the steps of changing the case of each of the ones of the keywords to create new case keywords, and determining the metanym for each of the new case keywords.

4. The method of claim 2 wherein the free text query system accepts input in a first language, wherein the keywords and the metanyms are in the first language, wherein the free text query system has a first language component for performing processing specific to the first language, and said method further including the steps of:

creating a second language component for performing processing specific to a second language; and converting the synonyms and metanyms from the first language to the second language in response to creating the second language component.

5. The method of claim 2 wherein the computer system has a default probability indicating a likelihood that a candidate that is unassociated with a metanym is relevant to the selection, and the method further including the steps of:

identifying candidates unassociated with each of the determined metanyms to create second identified candidates, and multiplying the likelihood of each second identified candidates by the default probability, and wherein the step of generating a list includes the step of generating a list of the candidates according to the likelihood of the first identified candidates and the second identified candidates.

6. The method of claim 2 wherein the computer system has a plurality of help topics for providing assistance to the user, wherein the candidates correspond to the help topics, and wherein the step of generating a list includes the step of generating a list of the help topics.

7. In a computer system having a free text query system for receiving input from a user indicating a selection and for generating a list of candidates for the selection, a method comprising the steps of:

receiving input comprising a plurality of words from the user indicating a selection, wherein each of the words has a form;

providing a plurality of keywords to the computer system that are relevant to the selection and that are associated with candidates and identifying ones of the keywords within the received input;

identifying the candidates associated with the ones of the keywords, wherein each of the candidates has an associated likelihood that the selection refers to the candidate;

providing a definiteness component for determining a form of each of the ones of the keywords and invoking the definiteness component to determine the form of the ones of the keywords in response to identifying the candidates associated with the ones of the keywords;

adjusting the probability for each of the identified candidates in response to invoking the definiteness component; and generating a list of the identified candidates according to the likelihood of the identified candidates.

8. The method of claim 7 wherein the computer system has a functional word list containing entries which indicate the form of a plurality of words, and wherein the step of invoking the definiteness component includes the steps of:

for each of the identified keywords, determining a preceding word in the received input to the keyword;

searching the functional word list to find an entry matching the preceding word; and accessing the found entry to determine the form of the keyword.

9. The method of claim 7 wherein the computer system has a plurality of help topics for providing assistance to the user, wherein the candidates correspond to the help topics, and wherein the step of generating a list includes the step of generating a list of the help topics.

10. In a computer system, the computer system having a free text query system for receiving input from a user comprising a plurality of words indicating a selection and for generating a list of candidates for the selection and a disambiguation component, each candidate having an associated likelihood that the selection refers to the candidate, each word having a usage of either a noun or a verb, the disambiguation component for determining the usage of a word, a usage of each word being associated with a candidate, a method comprising the steps of:

receiving input from the user indicating the selection;

invoking the disambiguation component to determine the usage of the words in the received input;

identifying the candidates associated with the words in response to determining the usage of the words; and generating a list of the identified candidates according to the likelihood of the identified candidates.

11. The method of claim 10 wherein the computer system has a disambiguation list containing words having both a noun usage and a verb usage and a rule base for determining the usage of a word, and wherein the step of invoking the disambiguation component includes the steps of:

searching the disambiguation list to determine whether each word in the received input is found in the disambiguation list; and for each word found in the disambiguation list,
determining a preceding word from the received input;
determining a following word from the received input; and
invoking the role base with the preceding word and the following word to determine the usage of the word.

12. The method of claim 10 wherein the computer system has a plurality of help topics for providing assistance to the user, wherein the candidates correspond to the help topics, and wherein the step of generating a list includes the step of generating a list of the help topics.

13. A free-text query system comprising:
a user input component for receiving user input containing a plurality of words indicating a selection, the selection having a type;
a keyword component for identifying keywords within the user input, keywords being predetermined to be relevant to the type of the selection;
a metanym component for determining a metanym associated with each keyword, the metanym being a general concept for the keyword that is language independent; and
a generating component for identifying a candidate associated with each metanym and generating a list of the identified candidates according to an associated likelihood that the selection refers to the identified candidates.

14. The free text query system of claim 13 wherein the keyword component further comprises:
a disambiguation component for determining a usage of the words in the user input and for determining a keyword associated with the usage of the words.

15. The free text query system of claim 13, further comprising:
a definiteness component for receiving the list of identified candidates from the generating component, for determining a form of each keyword, and for adjusting the likelihood of the identified candidates in response to determining the form of the keyword.

16. The free text query system of claim 13 wherein the keyword component further comprises:
a capitalization component for determining a case of the words in the user input and for determining a keyword associated with the case of the words.

17. The free text query system of claim 13, further comprising:
an internationalization component for converting the free text query system from a first language to a second language before the user input component receives the user input.

18. The free text query system of claim 13 wherein the generating component generates a list of help topics, wherein the help topics contain information to assist the user.

19. The free text query system of claim 13 wherein the generating component increases the likelihood of each identified candidate when each metanym is associated with the identified candidate and decreases the likelihood of each identified candidate when each metanym is not associated with the identified candidate.

20. A computer-readable medium containing instructions for controlling a computer system to perform a method, the computer system having a plurality of help topics for providing assistance to a user of the computer system and a free text query system for receiving input from the user indicating a selection and for generating a list of candidates for the selection, the method comprising the steps of:
receiving input comprising a plurality of words from the user indicating a selection;
providing a plurality of keywords relevant to the selection to the computer system and identifying ones of the keywords within the received input in response to receiving the input;
providing a plurality of metanyms to the computer system, wherein each of the metanyms is a general concept describing at least one of time keywords, wherein each of the metanyms is associated with a candidate help topic and determining the metanym for each of the ones of the keywords in response to identifying the ones of the keywords;
identifying the candidate help topic associated with each of the determined metanyms, wherein each candidate help topic has an associated likelihood that the selection refers to the candidate help topic;
for each identified candidate help topic,
increasing the likelihood of time identified candidate help topic when each of the determined metanyms is associated with time identified candidate help topic;
decreasing the likelihood of the identified candidate help topic when each of the determined metanyms is not associated with the identified candidate help topic; and
generating a list of the identified candidate help topics according to the likelihood of the identified candidate help topics.

21. A computer-readable medium containing instructions for controlling a computer system to perform a method, the computer system having a free text query system for receiving input from a user indicating a selection and for generating a list of candidates for the selection, the method comprising the steps of:
receiving input comprising a plurality of words from the user indicating a selection;
providing a plurality of keywords relevant to the selection to the computer system and identifying ones of the keywords within the received input in response to receiving the input;
providing a plurality of metanyms to the computer system, wherein each of the metanyms is a general concept describing at least one of the keywords and is associated with a candidate, wherein the general concept describing at least one of the keywords is not particular to a natural language, and determining the metanym for each of the ones of the keywords in response to identifying the ones of the keywords;
identifying the candidate associated with each determined metanym, wherein each candidate has an associated likelihood that the selection refers to the candidate; and
generating a list of the identified candidates according to the likelihood of the identified candidates.

22. The computer-readable medium of claim 21 wherein each of the plurality of words has a case, wherein the step of determining the metanym includes the steps of changing the case of each of the ones of the keywords to create new case keywords, and determining the metanym for each of the new case keywords.

23. The computer-readable medium of claim 21 wherein the free text query system accepts input in a first language, wherein the keywords and the metanyms are in the first language, wherein the free text query system has a first language component for performing processing specific to the first language, and said method further including the steps of:

creating a second language component for performing processing specific to a second language; and converting the synonyms and metanyms from the first language to the second language in response to creating the second language component.

24. The computer-readable medium of claim 21 wherein the computer system has a default probability indicating a likelihood that a candidate that is unassociated with a metanym is relevant to the selection, and the method further including the steps of:

identifying candidates unassociated with each of the determined metanyms to create second identified candidates, and multiplying the likelihood of each second identified candidates by the default probability, and wherein the step of generating a list includes the step of generating a list of the candidates according to the likelihood of the first identified candidates and the second identified candidates.

25. The computer-readable medium of claim 21 wherein the computer system has a plurality of help topics for providing assistance to the user, wherein the candidates correspond to the help topics, and wherein the step of generating a list includes the step of generating a list of the help topics.

26. A computer-readable medium containing instructions for controlling a computer system to perform a method, the computer system having a free text query system for receiving input from a user indicating a selection and for generating a list of candidates for the selection, the method comprising the steps of:

receiving input comprising a plurality of words from the user indicating a selection, wherein each of the words has a form;

providing a plurality of keywords to the computer system that are relevant to the selection and that are associated with candidates and identifying ones of the keywords within the received input;

identifying the candidates associated with the ones of the keywords, wherein each of the candidates has an associated likelihood that the selection refers to the candidate;

providing a definiteness component for determining a form of each of the ones of the keywords and invoking the definiteness component to determine the form of the ones of the keywords in response to identifying the candidates associated with the ones of the keywords;

adjusting the probability for each of the identified candidates in response to invoking the definiteness component; and generating a list of the identified candidates according to the likelihood of the identified candidates.

27. The computer-readable medium of claim 26 wherein the computer system has a functional word list containing entries which indicate the form of a plurality of words, and wherein the step of invoking file definiteness component includes the steps of:

for each of the identified keywords,
determining a preceding word in the received input to the keyword;
searching the functional word list to find an entry matching the preceding word; and
accessing file found entry to determine the form of the keyword.

28. The computer-readable medium of claim 26 wherein the computer system has a plurality of help topics for providing assistance to the user, wherein the candidates correspond to the help topics, and wherein the step of generating at list includes the step of generating a list of the help topics.

29. A computer-readable medium containing instructions for controlling a computer system to perform a method, the computer system having a free text query system for receiving input from a user comprising a plurality of words indicating a selection and for generating a list of candidates for the selection and a disambiguation component, each candidate having an associated likelihood that the selection refers to the candidate, each word having a usage of either a noun or a verb, the disambiguation component for determining the usage of a word, a usage of each word being associated with a candidate, the method comprising the steps of:

receiving input from the user indicating the selection;

invoking the disambiguation component to determine the usage of the words in the received input;

identifying the candidates associated with the words in response to determining the usage of the words; and generating a list of the identified candidates according to the likelihood of the identified candidates.

30. The computer-readable medium of claim 29 wherein the computer system has a disambiguation list containing words having both a noun usage and a verb usage and a rule base for determining the usage of a word, and wherein the step of invoking the disambiguation component includes the steps of:

searching the disambiguation list to determine whether each word in the received input is found in the disambiguation list; and for each word found in the disambiguation list,
determining a preceding word from the received input;
determining a following word from the received input; and
invoking the rule base with the preceding word and the following word to determine the usage of the word.

31. The computer-readable medium of claim 29 wherein the computer system has a plurality of help topics for providing assistance to the user, wherein the candidates correspond to the help topics, and wherein the step of generating a list includes the step of generating a list of the help topics.

* * * * *